（12）United States Patent
Lim et al.

(10) Patent No.: US 8,847,895 B2
(45) Date of Patent: *Sep. 30, 2014

(54) TOUCH PANEL AND ELECTRONIC DEVICE INCLUDING THE SAME

(75) Inventors: Seong-taek Lim, Suwon-si (KR);
Sung-hyuk Park, Yongin-si (KR);
Sung-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 951 days.

This patent is subject to a terminal disclaimer.

(21) Appl. No.: 12/719,281

(22) Filed: Mar. 8, 2010

(65) Prior Publication Data

US 2010/0321330 A1 Dec. 23, 2010

(30) Foreign Application Priority Data

Jun. 19, 2009 (KR) .................. 10-2009-0055035

(51) Int. Cl.
*G09G 5/00* (2006.01)
*G06F 3/044* (2006.01)
*G06F 3/01* (2006.01)
*G06F 3/0482* (2013.01)
*G06F 1/16* (2006.01)
*G06F 3/023* (2006.01)
*G06F 3/0488* (2013.01)
*G06F 3/02* (2006.01)

(52) U.S. Cl.
CPC .............. *G06F 3/016* (2013.01); *G06F 3/044* (2013.01); *G06F 3/0482* (2013.01); *G06F 1/1626* (2013.01); *G06F 3/0238* (2013.01); *G06F 3/04886* (2013.01); *G06F 3/023* (2013.01); *G06F 3/0202* (2013.01)
USPC ...................................... 345/173; 178/18.03

(58) Field of Classification Search
CPC ....... G06F 3/016; G06F 3/0202; G06F 3/023; G06F 3/041; G06F 3/0412; G06F 3/0488; G06F 3/04886
USPC .................... 345/173, 168; 178/18.03–18.07; 715/863, 864
See application file for complete search history.

(56) References Cited

U.S. PATENT DOCUMENTS 4,923,057 A 5/1990 Carlson et al.
4,963,417 A 10/1990 Taniguchi et al.
(Continued)

FOREIGN PATENT DOCUMENTS

CN 1829951 A 9/2006
EP 2 026 178 A1 2/2009
(Continued)

OTHER PUBLICATIONS

Extended European search report dated Oct. 7, 2010 issued by the European Patent Office in counterpart European Application No. 10166013.2 of co-pending U.S. Appl. No. 12/780,996.

(Continued)

*Primary Examiner* — Tom Sheng
(74) *Attorney, Agent, or Firm* — Sughrue Mion, PLLC

(57) ABSTRACT

A touch panel which is used as an input device for an electronic device, etc., and an electronic device including the touch panel are provided. A touch panel includes a first substrate, and a second substrate spaced from the first substrate by a distance and having a contact surface. A fluid is filled in a gap between the first substrate and the second substrate, and an input button area is delimited due to movement of the fluid when a driving voltage is applied. If a thickness of the gap between the first substrate and the second substrate is reduced below a threshold thickness value in the input button area, the driving voltage is cut off.

23 Claims, 11 Drawing Sheets

(56) References Cited

U.S. PATENT DOCUMENTS

| | | | |
|---|---|---|---|
| 5,055,840 A | 10/1991 | Bartlett | |
| 5,222,895 A | 6/1993 | Fricke | |
| 5,856,822 A | 1/1999 | Du et al. | |
| 5,977,867 A | 11/1999 | Blouin | |
| 6,118,435 A | 9/2000 | Fujita et al. | |
| 6,278,439 B1 | 8/2001 | Rosenberg et al. | |
| 6,317,116 B1 | 11/2001 | Rosenberg et al. | |
| 6,429,846 B2 | 8/2002 | Rosenberg et al. | |
| 6,809,462 B2 | 10/2004 | Pelrine et al. | |
| 7,051,292 B2 | 5/2006 | Nagase | |
| 7,067,756 B2 | 6/2006 | Cok | |
| 7,131,073 B2 | 10/2006 | Rosenberg et al. | |
| 7,196,688 B2 | 3/2007 | Schena | |
| 7,202,837 B2 | 4/2007 | Ihara | |
| 7,268,770 B1 | 9/2007 | Takahata et al. | |
| 7,339,572 B2 | 3/2008 | Schena | |
| 7,342,573 B2 | 3/2008 | Ryynaenen et al. | |
| 7,436,396 B2 | 10/2008 | Akieda et al. | |
| 7,477,242 B2 | 1/2009 | Cross et al. | |
| 7,511,706 B2 | 3/2009 | Schena | |
| 7,589,714 B2 | 9/2009 | Funaki | |
| 7,598,949 B2 | 10/2009 | Han | |
| 7,608,976 B1 | 10/2009 | Cheng et al. | |
| 7,679,611 B2 | 3/2010 | Schena | |
| 7,688,080 B2 * | 3/2010 | Golovchenko et al. | 324/660 |
| 7,719,167 B2 | 5/2010 | Kwon et al. | |
| 8,164,573 B2 | 4/2012 | Dacosta et al. | |
| 8,345,013 B2 | 1/2013 | Heubel et al. | |
| 8,581,866 B2 * | 11/2013 | Park et al. | 345/173 |
| 2001/0026636 A1 | 10/2001 | Mainguet | |
| 2001/0035854 A1 | 11/2001 | Rosenberg et al. | |
| 2002/0033795 A1 | 3/2002 | Shahoian et al. | |
| 2002/0039620 A1 | 4/2002 | Shahinpoor et al. | |
| 2002/0101410 A1 | 8/2002 | Sakata et al. | |
| 2003/0016849 A1 | 1/2003 | Andrade | |
| 2004/0090426 A1 | 5/2004 | Bourdelais et al. | |
| 2005/0057528 A1 | 3/2005 | Kleen | |
| 2005/0076824 A1 | 4/2005 | Cross et al. | |
| 2005/0130604 A1 | 6/2005 | Chipchase et al. | |
| 2005/0200286 A1 * | 9/2005 | Stoschek et al. | 315/77 |
| 2005/0285846 A1 | 12/2005 | Funaki | |
| 2006/0097991 A1 | 5/2006 | Hotelling et al. | |
| 2006/0099808 A1 | 5/2006 | Kondo | |
| 2006/0103634 A1 | 5/2006 | Kim et al. | |
| 2006/0119589 A1 | 6/2006 | Rosenberg et al. | |
| 2007/0080951 A1 | 4/2007 | Maruyama et al. | |
| 2007/0152974 A1 | 7/2007 | Kim et al. | |
| 2007/0152982 A1 * | 7/2007 | Kim et al. | 345/173 |
| 2007/0182718 A1 | 8/2007 | Schoener | |
| 2007/0211032 A1 | 9/2007 | Ahn et al. | |
| 2007/0229464 A1 | 10/2007 | Hotelling et al. | |
| 2008/0007815 A1 | 1/2008 | Liang et al. | |
| 2008/0024459 A1 | 1/2008 | Poupyrev et al. | |
| 2008/0024461 A1 | 1/2008 | Richter et al. | |
| 2008/0036746 A1 | 2/2008 | Klinghult | |
| 2008/0100590 A1 * | 5/2008 | Hur et al. | 345/173 |
| 2008/0111788 A1 | 5/2008 | Rosenberg et al. | |
| 2008/0143689 A1 | 6/2008 | Foo et al. | |
| 2008/0158169 A1 | 7/2008 | O'Connor et al. | |
| 2008/0165134 A1 | 7/2008 | Krah | |
| 2008/0165158 A1 | 7/2008 | Hotelling et al. | |
| 2008/0284277 A1 | 11/2008 | Kwon et al. | |
| 2009/0002199 A1 | 1/2009 | Lainonen et al. | |
| 2009/0002328 A1 | 1/2009 | Ullrich et al. | |
| 2009/0046065 A1 | 2/2009 | Liu et al. | |
| 2009/0046068 A1 | 2/2009 | Griffin | |
| 2009/0075694 A1 | 3/2009 | Kim et al. | |
| 2009/0085878 A1 | 4/2009 | Heubel et al. | |
| 2009/0182501 A1 * | 7/2009 | Fyke et al. | 701/208 |
| 2009/0231305 A1 | 9/2009 | Hotelling et al. | |
| 2009/0308737 A1 | 12/2009 | Kudoh | |
| 2010/0024573 A1 | 2/2010 | Daverman et al. | |
| 2010/0026655 A1 | 2/2010 | Harley | |
| 2010/0059295 A1 | 3/2010 | Hotelling et al. | |
| 2010/0060610 A1 | 3/2010 | Wu | |
| 2010/0149108 A1 | 6/2010 | Hotelling et al. | |
| 2010/0156829 A1 | 6/2010 | Shimodaira | |
| 2010/0214232 A1 | 8/2010 | Chan et al. | |
| 2010/0259485 A1 | 10/2010 | Chuang | |
| 2010/0321330 A1 | 12/2010 | Lim et al. | |
| 2010/0321335 A1 | 12/2010 | Lim et al. | |
| 2011/0057899 A1 | 3/2011 | Sleeman et al. | |
| 2011/0163978 A1 | 7/2011 | Park et al. | |
| 2011/0181530 A1 | 7/2011 | Park et al. | |
| 2011/0227862 A1 | 9/2011 | Lim | |
| 2011/0279374 A1 | 11/2011 | Park et al. | |
| 2012/0019467 A1 | 1/2012 | Hotelling et al. | |
| 2012/0038563 A1 | 2/2012 | Park et al. | |
| 2012/0086651 A1 | 4/2012 | Kwon et al. | |
| 2012/0127122 A1 | 5/2012 | Lim | |
| 2012/0262410 A1 | 10/2012 | Lim | |

FOREIGN PATENT DOCUMENTS

| | | |
|---|---|---|
| JP | 6-34940 A | 2/1994 |
| JP | 9-319509 A | 12/1997 |
| JP | 11-203025 A | 7/1999 |
| JP | 11-273501 A | 10/1999 |
| JP | 2000-066782 A | 3/2000 |
| JP | 2001-282433 A | 10/2001 |
| JP | 2002-157087 A | 5/2002 |
| JP | 2002-342035 A | 11/2002 |
| JP | 2004-71765 A | 3/2004 |
| JP | 2005-107804 A | 4/2005 |
| JP | 2005-135876 A | 5/2005 |
| JP | 2005-275632 A | 10/2005 |
| JP | 2006-011646 A | 1/2006 |
| JP | 2006-146611 A | 6/2006 |
| JP | 2007-513392 A | 5/2007 |
| JP | 2008-33739 A | 2/2008 |
| JP | 2008-257748 A | 10/2008 |
| JP | 2010-016969 A | 1/2010 |
| JP | 2010-79882 A | 4/2010 |
| JP | 2010-108505 A | 5/2010 |
| JP | 2011-3177 A | 1/2011 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0126760 A | 12/2009 |
| KR | 10-2010-0011368 A | 2/2010 |
| KR | 10-2010-0020065 A | 2/2010 |
| KR | 10-2010-0136759 A | 12/2010 |
| WO | 03/050754 A1 | 6/2003 |
| WO | 2004/014115 A1 | 2/2004 |
| WO | 2004/053909 A1 | 6/2004 |
| WO | 2004/106099 A1 | 12/2004 |
| WO | 2005/010735 A1 | 2/2005 |
| WO | 2005/091257 A1 | 9/2005 |
| WO | 2008/037275 A1 | 4/2008 |
| WO | 2009/002605 A1 | 12/2008 |

OTHER PUBLICATIONS

US Advisory Action, dated Apr. 26, 2013, issued in U.S. Appl. No. 12/849,310.

Final US Office Action, dated Dec. 20, 2012, issued in U.S. Appl. No. 12/849,310.

(56) References Cited

OTHER PUBLICATIONS

Non-Final US Office Action, dated Aug. 28, 2012, issued in U.S. Appl. No. 12/849,310.
Final US Office Action, dated Mar. 27, 2013, issued in U.S. Appl. No. 12/948,479.
Non-Final US Office Action, dated Oct. 15, 2012, issued in U.S. Appl. No. 12/948,479.
Non-Final US Office Action, dated Feb. 1, 2013, issued in U.S. Appl. No. 13/103,221.
Non-Final US Office Action, dated Apr. 22, 2013, issued in U.S. Appl. No. 13/050,550.
Non-Final US Election Requirement, dated Apr. 10, 2013, issued in U.S. Appl. No. 13/097,937.
European Communication, dated Mar. 19, 2013, issued in European Application No. 11150285.2.
Non-Final US Office Action, dated Mar. 15, 2013, issued in U.S. Appl. No. 12/889,800.
Chinese Office Action issued Oct. 10, 2013 for corresponding Application No. 201010200349.1.
Final US Office Action, dated Nov. 22, 2013, issued in U.S. Appl. No. 12/849,310.
Final US Office Action, dated Dec. 5, 2013, issued in U.S. Appl. No. 13/050,550.
Non-Final US Office Action, dated Dec. 6, 2013, issued in U.S. Appl. No. 13/190,120.
Non-Final US Office Action, dated Jun. 20, 2013, issued in U.S. Appl. No. 12/780,996.
Non-Final US Office Action, dated Jul. 17, 2013, issued in U.S. Appl. No. 13/097,937.
Non-Final US Office Action, dated Jul. 8, 2013, issued in U.S. Appl. No. 12/849,310.
Non-Final US Office Action, dated Aug. 12, 2013, issued in U.S. Appl. No. 13/224,422.
Non-Final US Office Action, dated Aug. 16, 2013, issued in U.S. Appl. No. 12/889,800.
US Notice of Allowance, dated Oct. 25, 2013, issued in U.S. Appl. No. 12/780,996.
Notice of Allowance, dated Jan. 22, 2014, issued by the USPTO in related U.S. Appl. No. 12/780,996.
Communication, dated Mar. 4, 2014, issued by the Japanese Patent Office in counterpart Japanese Patent Application No. 2010-133879.
Notice of Allowance, dated Mar. 28, 2014, issued in related U.S. Appl. No. 12/849,310.
Final US Office Action, dated Mar. 7, 2014, issued in related U.S. Appl. No. 13/097,937.
Non-Final US Office Action, dated Mar. 7, 2014, issued in related U.S. Appl. No. 13/224,422.
Final US Office Action, dated Apr. 3, 2014, issued in related U.S. Appl. No. 12/889,800.

* cited by examiner

TOUCH PANEL AND ELECTRONIC DEVICE INCLUDING THE SAME

CROSS-REFERENCE TO RELATED APPLICATION

This application claims priority from Korean Patent Application No. 10-2009-55035, filed on Jun. 19, 2009, the disclosure of which is herein incorporated by reference in its entirety for all purposes.

BACKGROUND

1. Field

One or more embodiments relate to a user input device, and more particularly, to a touch panel and an electronic device including the same.

2. Description of the Related Art

A touch panel is a kind of input device used to generate an input signal and to determine a position of an input device such as a user's finger or a touch pen, etc., by sensing the contact thereon. Input data or signals may be generated on using a touch panel by contacting or pressing the touch panel with a finger, a stylus pen or the like. The touch panel may be used in association with a display. A touch panel which is mounted on the screen of a display, such as Liquid Crystal Display (LCD), Plasma Display Panel (PDP), Cathode Ray Tube (CRT) or the like, is called a "touch screen". A touch panel may be integrated with a display to configure the screen of the display or may be attached additionally on the screen of the display.

The touch panel can be substituted for an input device such as a keyboard and also allow simple manipulations. Moreover, the touch panel can provide various types of buttons according to the types of applications to be executed or stages of the executed application. Accordingly, a touch panel, specifically, a touch screen, has been widely used as an input device for electronic equipment, such as a mobile phone, a Personal Digital Assistant (PDA), a Portable Multimedia Player (PMP), a digital camera, a portable games, an MPEG-1 Audio Layer 3 (MP3) player, etc., as well as an Automated Teller Machine (ATM), an information trader, a ticket vending machine, etc.

A touch panel can be classified into a resistive type, a capacitive type, a saw type, an infrared type, etc., according to methods of sensing inputs. A capacitive type touch panel determines whether a to generate an input signal and a position of the input device by measuring variations in capacitance due to contact or pressure. However, the capacitive type touch panel fails to offer a sense of input, that is, a feeling of recognition that a user gets upon inputting. In order to overcome this disadvantage, a method of installing a vibration motor below a touch panel has been proposed. The method offers users a sense of input by vibrating the whole touch panel using the vibration motor when contact is sensed.

SUMMARY

One or more embodiments provide a touch panel on which a button may be identified through tactile sense, and an electronic device including the touch panel.

One or more embodiments also provide a touch panel which provides a clicking sensation similar to that experienced when pressing a mechanical key pad or mechanical button, and an electronic device including the touch panel.

According to an aspect of an embodiment, there is provided a touch panel including a first substrate, and a second substrate spaced from the first substrate by a distance and having a contact surface thereon. A fluid is filled in a gap between the first substrate and the second substrate. An input button area is delimited due to movement of the fluid when a driving voltage is applied, and if a thickness of the gap between the first substrate and the second substrate equal to or less than a threshold thickness due to a pressure applied on the input button area, the driving voltage is cut off.

According to an aspect of another embodiment, there is provided a touch panel including a pair of substrates and a plurality of driving electrodes. The pair of substrates are composed of a first substrate, and a second substrate spaced from the first substrate and having a deformable contact surface thereon. The plurality of driving electrodes include at least one first electrode formed on the first substrate and at least one second electrode formed on the second substrate. Also, fluid is filled in a gap between the pair of substrates.

According to an aspect of another embodiment, there is provided a touch panel including a first substrate and a deformable second substrate spaced from the first substrate by a distance and having a contact surface thereon. Also, a fluid is filled in a gap between the first substrate and the second substrate and sealed. The user contact surface includes a first area in which a thickness of the gap is reduced by a force locally applied to the fluid during a time at which a driving voltage is applied to the first area, and a second area to which a part of the fluid flows and in which a thickness of the gap increases. The second area is delimited as an input button area on the contact surface.

According to an aspect of another embodiment, there is provided a touch panel including a hard first substrate and a deformable second substrate spaced from the first substrate by a distance and having a contact surface thereon. A fluid is filled in a gap between the first substrate and the second substrate. In the touch panel, when an electrostatic force is applied locally between the first substrate and the second substrate, the second substrate is protruded in a peripheral area of an area to which the electrostatic force is applied and the protruded area of the second substrate is delimited as an input button area. If a pressure that is sensed on the input button area is greater than a threshold value, the electrostatic force is removed.

According to an aspect of another embodiment, there is provided an electronic device including a pair of substrates and a plurality of driving electrodes. The pair of substrates are composed of a first substrate, and a second substrate spaced from the first substrate and having a deformable contact surface. The plurality of driving electrodes includes a plurality of first electrodes formed on the first substrate and a plurality of second electrodes formed on the second substrate. A fluid is filled in a gap between the pair of substrates. The electronic device further includes a controller to control a driving voltage to be applied to an entire or partial area of the plurality of driving electrodes.

BRIEF DESCRIPTION OF THE DRAWINGS

The above and other aspects will be more apparent from the following detailed description of embodiments taken in conjunction with the accompanying drawings, in which:

FIGS. 4A and 4B illustrate the structure of an exemplary touch panel, wherein FIG. 4A is a perspective view showing upper and lower substrates of the exemplary touch panel separated, and FIG. 4B is a cross-sectional view of the exemplary touch panel with the upper and lower substrates coupled together;

Elements, features, and structures are denoted by the same reference numerals throughout the drawings and the detailed description, and the size and proportions of some elements may be exaggerated in the drawings for clarity and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. These various changes, modifications, and equivalents are intended to be included in the scope of the appended claims. Also, descriptions of well-known functions and constructions are omitted to increase clarity and conciseness.

A touch panel according to embodiments that will be described below is a kind of input device and may be mounted onto various devices. For example, the touch panel may be an input device having buttons whose types, sizes, shapes, numbers, etc. vary according to what application is executed or according to stages of the executed application. However, the touch panel is not limited to this, and may be mounted onto an electronic device, for example, including fixed input buttons.

The touch panel may be used in an electronic device having as a user interface a touch screen where buttons are displayed on a display therebelow. Specifically, the buttons that are displayed on the display may be numeric keys, Qwerty keys, icon menus, or menu bars, etc., and various combinations in the type, size, shape and/or number of the buttons are also included in the inventive concept. A display, such as a Liquid Crystal Display (LCD), an Organic Light Emitting Diode (OLED) display, etc., may be used with the touch panel, and any other display may also be used along with various combinations in the type, size, shape and/or number, etc. of buttons.

Figure 1A:
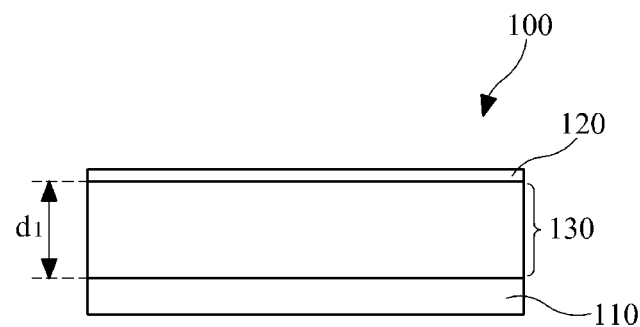
FIGS. 1A and 1B are cross-sectional views showing an exemplary touch panel, wherein FIG. 1A corresponds to an exemplary touch panel to which no driving voltage is supplied, and FIG. 1B corresponds to an exemplary touch panel to which a driving voltage is supplied.
Figure 1B:
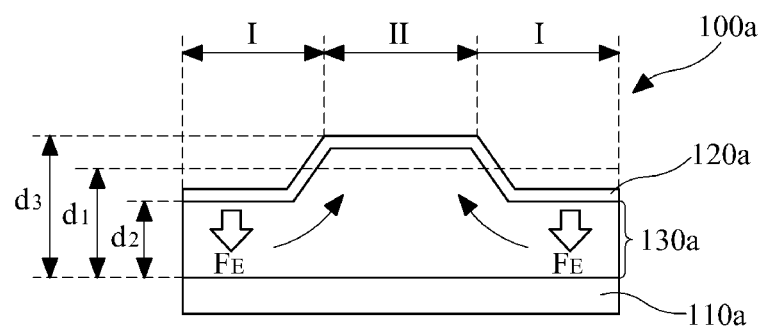

FIGS. 1A and 1B are cross-sectional views showing an exemplary touch panel, wherein FIG. 1A corresponds to a configuration of the exemplary touch panel in which no driving voltage $V_d$ is supplied, and FIG. 1B corresponds to a configuration of the exemplary touch panel in which a driving voltage $V_d$ is supplied. In FIGS. 1A and 1B, the thicknesses of substrates and variations in thickness are exaggerated for clarity.

Referring to FIG. 1A, the touch panel 100 includes a pair of substrates (that is, a lower substrate 110 and an upper substrate 120) and an elastic layer 130 interposed between the pair of substrates 110 and 120. In addition, in order to apply driving power between the upper and lower substrates 120 and 110, driving electrodes (not shown) may be provided on the lower substrate 110 and/or on the upper substrate 120. The driving electrodes may include a pair of electrodes that generate electrostatic force when a driving voltage is applied thereto, but is not limited to this.

The lower substrate 110 is positioned, for example, on a display of electrostatic equipment. The lower substrate 110 is not deformed when a certain attractive force or repulsive force is applied between the lower substrate 110 and the upper substrate 120. For prevention of deformation, the lower substrate 110 may be made of a hard substance, and for example, the lower substrate 110 may be a glass substrate made of transparent glass. However, there are cases in which it may be advantageous for the lower substrate 110 to be made of a material other than a hard substance. For example, when the touch panel 100 is attached onto a hard display, the lower substrate 110 may alternatively be made of a transparent polymer film.

The top side of the upper substrate 120 is a contact surface (S) which is contacted when generating an input signal. The upper substrate 120 may be deformed when certain a driving force, for example, an attractive force or a repulsive force is applied thereon.

The upper substrate 120 is spaced a distance $d_1$ from the lower substrate 110 so that a gap is formed between the upper and lower substrate 110 and 120. The distance $d_1$ may be predetermined. The thickness of the gap, that is, the distance $d_1$ between the upper and lower substrates 120 and 110, is big enough to permit deformation of the upper substrate 120 when a driving force is applied between the upper and lower substrates 120 and 110.

The elastic layer 130 in which fluid is filled is interposed in the gap between the lower substrate 110 and the upper substrate 120. If a vertical force is applied to the elastic layer 130, the elastic layer part to which the force is applied is contracted, and the elastic layer part adjacent to the contracted part is expanded. Then, when the applied force is removed, the elastic layer 130 is restored to its original state. If the elastic layer 130 is deformed, the upper substrate 120, specifically, the contact surface is also deformed accordingly. Also, when the upper substrate 120 is deformed, fluid filled in the elastic layer 130 also moves accordingly. Elastic force of the elastic layer 130 is derived from the combination of a restoring force of the upper substrate 120, a viscosity of the fluid and/or a restoring force of elastic spacers.

Since the elastic layer 130 includes fluid filled in the gap between the upper and lower substrates 120 and 110 as described above, a sealant 150 (see FIG. 4B) may be applied in the edge portions in order to seal the fluid between the upper and lower substrates 120 and 110. The fluid may be liquid with a certain viscosity. In addition, in order to minimize interfacial reflection that occurs at interfaces of the materials used in the touch panel 100, index matching oil may be used as the fluid. A refraction index of the index matching oil may be adaptively chosen in consideration of a refraction index of a material forming interfaces with the elastic layer 130.

For example, a refraction index of the fluid may be chosen as a value capable of minimizing interfacial reflection to interfaces with the elastic layer 130 in consideration of the refraction indexes of the upper and lower substrates 120 and 110. If transparent driving electrodes are formed on each of the upper and lower substrates 120 and 110, respectively, a refraction index of the fluid may be chosen in consideration of interfacial reflection that occurs between the transparent electrodes and fluid. In this case, a refraction index of the index refraction oil may be a value that matches a refraction index of the transparent electrodes.

The elastic layer 130 may further include spacers 136 (see FIG. 4B) that are dispersed in the gap. The spacers may be very fine, transparent particles that are less than several tens of micrometers. Materials used to form the spacers are not limited and for example, the spacers may be made of elastomer. The spacers are used to provide the upper substrate 120 with a restoring force and to support the upper substrate 120 structurally.

The driving voltage is a source voltage to drive the touch panel 100 and thus locally vary the thickness of the elastic layer 130. The driving voltage may be supplied from a power supply of the electronic equipment on which the touch panel 100 is mounted. The driving voltage is used to delimit a button area on the contact surface S, and may be configured to provide a clicking sensation when a part of the button area is pressed. The button area may be predetermined. To provide the clicking sensation, the touch panel 100 may include a controller (not shown) to control the operation of the touch panel 100. The controller is connected to a sensing unit (not shown) which senses an input, and controls the driving voltage to be applied to the driving electrodes 140. For example, the controller may control the on/off state of a switch, according to an input signal from a user's finger, a stylus, or a pen, etc. that is sensed by the sensing unit. The controller may be implemented as an electrical circuit for controlling electronic equipment on which the touch panel 100 is mounted, or as a part of a microprocessor or a separate electrical circuit.

The sensing unit of the touch panel 100 senses an existence of an input or a degree of input from a user's finger, a stylus, a pen, or the like and generate an input signal based on the input or degree of input. The sensing unit may only sense the presence of the input with respect to the button area. Alternatively, the sensing unit may sense a degree of the input as a level according to a plurality of classified levels, as well as the presence of the input. For example, the gap between the upper and lower substrates 120 and 110 in the button area may be classified into a plurality of levels, and the degree of input is sensed depending on which level of the plurality of levels the gap thickness corresponds to.

FIG. 1B is a cross-sectional view of the touch panel 100 illustrated in FIG. 1A when the driving voltage is supplied to the touch panel 100 to delimit an input button area. As described above, the driving voltage is used to delimit an input button area and to provide a clicking sensation when a part of the input button area is pressed. The driving voltage may be supplied from an externally provided device. When a driving voltage is supplied, driving force is applied locally between a lower substrate 110a and an upper substrate 120a. The driving force may be applied directly to the upper and lower substrates 120a and 110a or through driving electrodes (not shown) formed on the upper and lower substrates 120a and 110a.

FIG. 1B shows the case where driving force is applied to the touch panel 100a, wherein an electric field is locally formed by electrodes located in a first area I of the touch panel 100a so that an electrostatic force $F_E$ arises between the upper and lower substrates 120a and 110a. However, the driving force is not limited to such an electrostatic force $F_E$. For example, the driving force may be exerted by a repulsive force generated by electrodes (not shown) located in the second area II of the touch panel 100a or the driving force may be derived by another kind of force. In the current embodiment, the case where electrostatic force arises in the first area I between the upper and lower substrates 120a and 110a will be described in detail, but it will be appreciated by those skilled in the art that there are other ways a force can arise between the upper and lower substrates 120a and 110a.

When an attractive force arises locally in the touch panel 100a, for example, in the first area I between the upper and lower substrates 120a and 110a, the upper substrate 120a in the first area I is pulled down toward the lower substrate 110a. That is, the upper substrate 120 is depressed in the first area I. As a result, the thickness of the elastic layer 130a in the first area I, that is, the gap between the upper and second substrates 120a and 110a in the first area I is reduced to $d_2$.

If the gap between the upper and lower substrates 120a and 110a in the first area I is reduced due to the local depression of the upper substrate 120a, a part of fluid in the first area I flows to the second area II. Accordingly, the amount of fluid in the second area II increases, so that the upper substrate 120a which is deformable is expanded in the second area II. That is, the upper substrate 120a in the second area II is protruded upward. For this, it is not required for all of the areas around the area II to be reduced. In the current embodiment, the thickness of the elastic layer 130a in the second area II, that is, the gap between the upper and lower substrates 120a and 110a in the second area II, is increased to $d_3$.

If the driving voltage continues to be supplied while the upper substrate 120a is deformed as illustrated in FIG. 1B, movement of fluid in the second area II is limited because the upper substrate 120a continues to press the fluid in the first area I. In the touch panel 100a having the above-described structure, in the second area II, an elastic force of the fluid, for example, a repulsive force that acts against a force with which a user presses the upper substrate 120a, also increases. Accordingly, the user which presses the second area II may feel an elastic force through his or her tactile sense, which increases along with the pressing force.

The amount of the driving force which can depress some parts of the upper substrate 120a and protrude other parts thereof may be adaptively adjusted according to a desired displacement of the upper substrate 120a, that is, according to a desired height difference $(d_3-d_2)$ between the protruded parts and depressed parts. There are a number of factors that influence how an input button area is formed on the contact surface through deformation of the upper substrate 120a. For example, the factors may include the driving force itself, the size of the first area I to which the driving force is applied, the elastic force of the upper substrate 120a, the elastic force of the spacers, a viscosity of the fluid, the size of the gap, etc.

When a driving voltage is applied to the touch panel 100a, as illustrated in FIG. 1B, the contact surface of the upper substrate 120a is deformed so as to be divided into the first area I which is depressed and the second area II which is protruded. Accordingly, a button input area may be delimited on the contact surface of the touch panel 100a using the first area I and the second areas II. For example, the protruded second area II may be delimited as an input button area. However, this is only exemplary, and the depressed first area I or a part surrounded by the depressed first area I in the protruded second area II may be delimited as an input button area. Details about delimiting an input button area using the first and second areas I and II will be described later.

As illustrated in FIG. 1B, if an input button area is formed on the contact surface using the first and second areas I and II, it is possible to recognize the input button area through tactile sense. That is, by sensing a concave-convex portion of the contact surface with a finger, stylus, or pen, etc., the user may recognize whether a contacted part belongs to an input button area. Accordingly, a tactile feedback function based on changes in surface shape may be implemented on the touch panel (100, 100a). Also, if the protruded second area II is pressed while a supplied driving voltage is maintained, the repulsive force of the pressed part gradually increases and accordingly it is possible to receive some sense of input upon pressing the input button.

Also, the touch panel 100a may offer a clicking sensation. The clicking sensation is a sense of "clicking" which can be felt through a finger, stylus, or pen, etc. The "clicking" is synonymous with the sensation felt when pressing a mechanical key pad which is used, for example, in a mobile phone, etc. Below a mechanical key pad, a thin metal plate having a dome shape, which is called a metal dome or popple, is installed below a key button. When the metal dome is pressed, the user may first sense a repulsive force due to the deformation. If the deformation exceeds a predetermined criteria, there is a buckling point causing a sharp deformation. Due to such a buckling point, the user can get a clicking sensation upon pressing a mechanical key pad. Also, when the pressing continues, the shape of the metal dome is deformed beyond the buckling point and reaches the lower electrodes. Once the shape of the metal dome reaches the lower electrodes, the input is recognized by the key pad and an input signal is generated.

Figure 2:
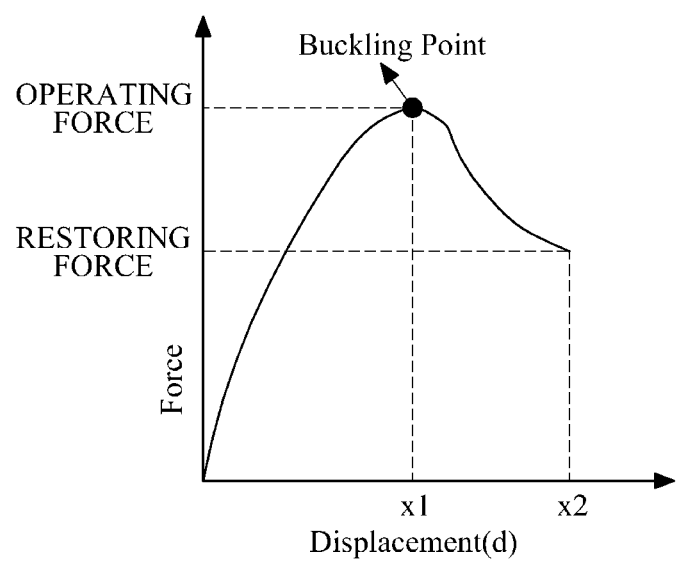
FIG. 2 is a graph showing a relationship of force to displacement for a metal dome structure according to the related art.

FIG. 2 is a graph showing a relationship of force to displacement in a metal dome structure. Referring to FIG. 2, at the initial stage, the displacement of the metal dome increases as a pressing force increases. Along with the increase of the pressing force, the supporting force of the metal dome increases and accordingly a repulsive force from the button also increases. Furthermore, the supporting force of the metal dome continues to increase until the pressing force reaches a predetermined criteria (that is, an operating force), and when the displacement of the metal dome reaches ×1, a buckling point is reached at which the supporting force of the metal dome sharply decreases. If the pressing force is maintained or increased beyond the bucking point, the displacement of the metal dome continues to increase, and when the displacement of the metal dome reaches ×2, the metal dome reaches the lower electrodes. Thereafter, when the pressing force disappears, the metal dome returns to its original state by a restoring force generated by the metal dome.

The touch panel according to the current embodiment provides a clicking sensation that is similar to that of a mechanism of a mechanical key pad, but using a different structure and technological technique. Hereinafter, a mechanism by which the touch panel according to the current embodiment provides a clicking sensation will be described in detail with reference to FIGS. 3A and 3B.

Figure 3A:
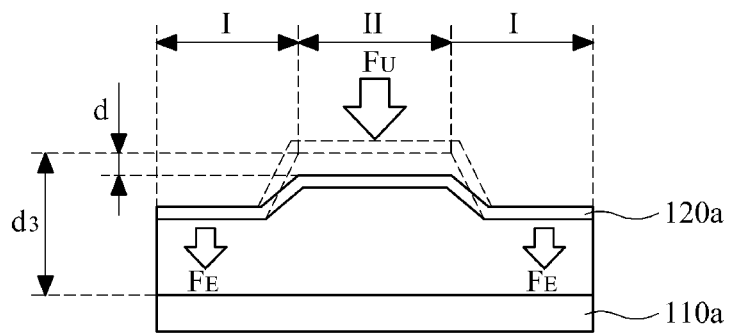
FIGS. 3A and 3B are views for explaining a mechanism by which a clicking sensation is implemented on the exemplary touch panel illustrated in FIGS. 1A and 1B.

FIG. 3A is a cross-sectional view of the exemplary touch panel 100a illustrated in FIG. 1B when a force $F_u$ begins to be applied on the touch panel 100a. Referring to FIG. 3A, since a driving voltage continues to be supplied during a time in which the force $F_u$ begins to be applied, an electrostatic force $F_E$ continues to be applied in the depressed part (the first area I of FIG. 1B). In FIG. 3A, dotted lines indicate a profile of the upper substrate 120a before the force $F_u$ is applied to the upper substrate 120a. While the electrostatic force $F_E$ acts between the upper and lower substrates 120a and 110a, an ability of the fluid, particularly, the fluid in the protruded part (the second area II of FIG. 1A), to flow is limited. As a result, an elastic force of the protruded part increases such that the elastic force can be felt. If the force with which the protruding part is increased, the repulsive force will be increased in response thereto and a correspondingly stronger repulsive force will be felt. However, since flow of the fluid is not completely suppressed by the electrostatic force $F_E$ and since the elastic layer itself also may be deformed, some displacement d may be made in the second area II of the upper substrate 120a at a time which the upper substrate 120a is pressed. In this case, due to the flow of the fluid, another displacement (not shown) may be made in the first area I of the upper substrate 120a in a direction which is opposite to the displacement direction of the second area II.

If the user continues to press the protruded second area II using a finger, a stylus, pen, etc., the displacement d increases and accordingly a stronger repulsive force is felt. The increased displacement d further reduces the gap between the upper and lower substrates 120a and 110a. If the force applied exceeds a level such that the displacement d reaches a value ×3, the driving voltage is cut off so that the gap between the upper and lower substrates 120a and 110a in the first area I returns to its original state. The level and the value ×3 may be predetermined. Here, it will be understood by those skilled in the art that the magnitude ×3 of the displacement d does not need to be equal to the displacement ×1 at the buckling point of the metal dome as described above.

Figure 3B:
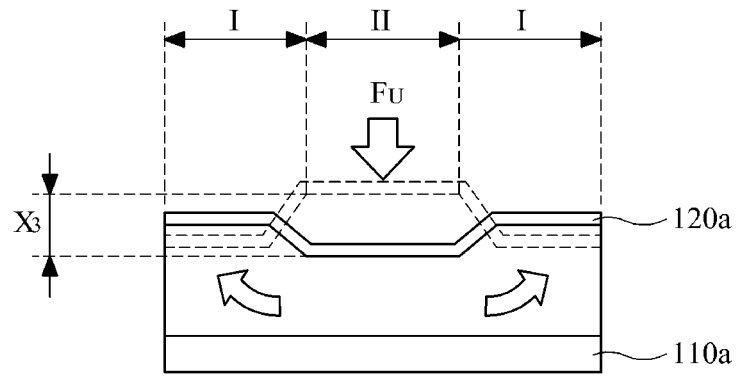

FIG. 3B is a cross-sectional view of the touch panel when the driving voltage is cut off. Referring to FIG. 3B, if the driving voltage is cut off, the electrostatic force $F_E$ (see FIG. 3A) applied to the depressed part (that is, the first area I) disappears, so that fluid in the protruded second area II can move freely into the first area I. Accordingly, when the driving voltage is cut off, a large amount of fluid moves to neighboring areas, that is, to the first area I. At this time, the repulsive force (elastic force of the protruded part) from the touch panel is rapidly reduced, and the displacement d of the protruded part also instantaneously increases due to the movement of the fluid. This operation of the touch panel is similar to the operation of a key pad having a metal dome at the buckling point. Accordingly, by using this mechanism, the touch panel may offer a user a clicking sensation similar to that which may be felt when pressing a mechanical key pad.

The determination of whether a force exceeding a threshold is applied on the touch panel, that is, a magnitude of displacement d of the pressed second area II, depends on the gap between the upper and lower substrates 120a and 110a, that is, the variations in the gap between the upper and lower substrates 120a and 110a. Various methods can be used to measure such variations in the gap. For example, by sensing variations in capacitance between the driving electrodes of the upper and lower substrates 120s and 110s, variations in the gap size can be determined. Details for a method of measuring variations in capacitance is known in the technical art related to capacitive type touch panels, and accordingly a detailed description thereof will be omitted.

In the touch panel according to the current embodiment, an input is recognized in association with a time at which the driving voltage is cut off. For example, a time at which the driving voltage is cut off may be recognized as a time at which an input happens. When the driving voltage is cut off, the driving force applied between the upper and lower substrates 120a and 110a disappears. This is the driving force that is caused when a force which exceeds a threshold so as to reduce a thickness of the gap between the upper and lower substrates 120a and 110a to a value equal to or less than a certain value. Accordingly, occurrence of input errors due to unintended slight contact may be avoided.

Alternatively, in the touch panel according to the current embodiment, the input may be recognized in multiple stages regardless of a time when the driving voltage is cut off. For example, degrees of force to be applied on the second area II may be classified into a plurality of levels, and the input may be recognized according to which of the classified levels the input corresponds to. In this case, a degree of force applied may be distinguished by a variation in the gap between the upper and lower substrates 120a and 110a, determined, for example, by a variation in capacitance due to a variation in the gap.

Figure 4A:
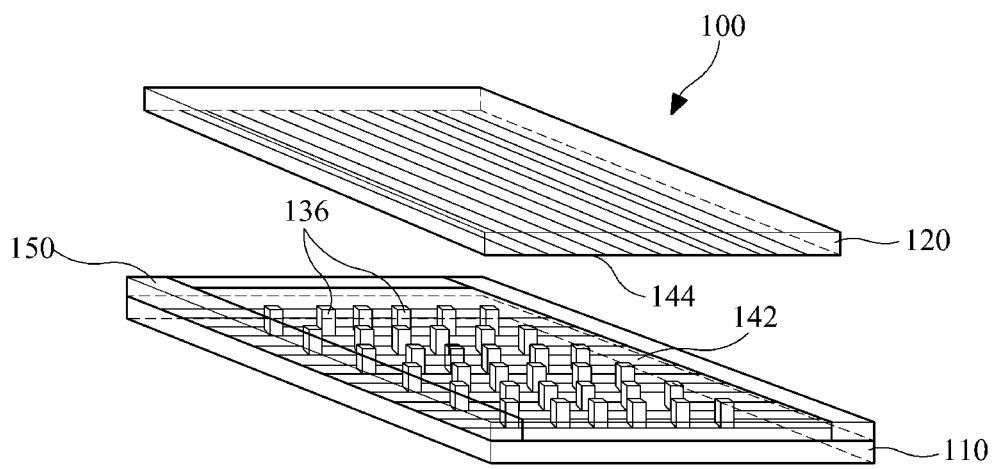
Figure 4B:
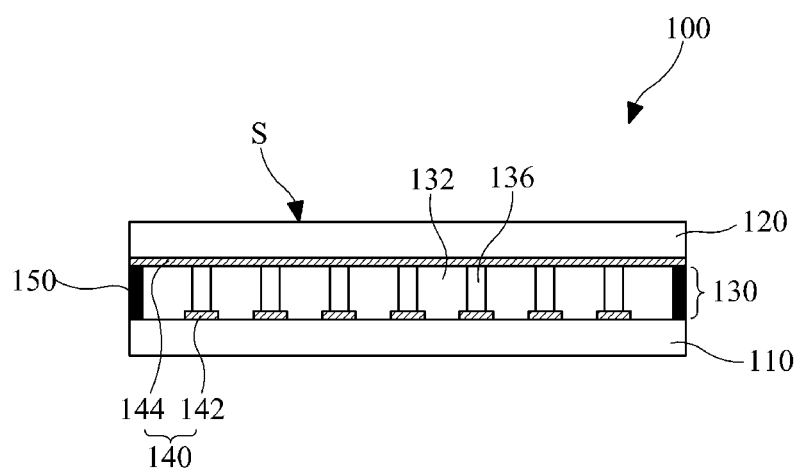

FIGS. 4A and 4B are views showing the entire structure of the touch panel 100, wherein FIG. 4A is a perspective view showing separated upper and lower substrates of the touch panel and FIG. 4B is a cross-sectional view of the touch panel with the coupled upper and lower substrates, cut along the longitudinal direction of the upper electrode pattern. In FIGS. 4A and 4B, the thicknesses of substrates, etc., the gap between substrates, the sizes, numbers and arrangements of other components, and so on are exaggerated or simplified for clarity. In the following description, the parts described above with reference to FIGS. 1A and 1B will be described in short and parts not described above will be described in detail.

Referring to FIGS. 4A and 4B, the touch panel 100 includes a lower substrate 110, an upper substrate 120, an elastic layer 130, driving electrodes 140 and sealant 150. The lower substrate 110 may be a transparent glass substrate and the upper substrate 120 may be a deformable, transparent polymer film. The lower substrate 110 is spaced a predetermined gap from the upper substrate 120, and in the gap, the elastic layer 130 is located. The elastic layer 130 includes fluid 132 and elastic spacers 136. The touch panel 100 may further include a power supply, a controller and a sensing unit, which are not shown in the drawings.

The elastic spacers 136 are very fine elements made of elastomer and a very large amount of the elastic spacers 136 is evenly distributed throughout the entire space of the gap. The elastic spacers 136 function to structurally support the upper substrate 120. When no supply voltage is supplied, the elastic spacers 136 allow the user contact surface to be as flat as possible. If a pressure is applied to the upper substrate 120, the elastic spacers 136 provide the upper substrate 120 with repulsive force.

The fluid 132 is filled in the gap between the lower substrate 110 and the upper substrate 120. The fluid 132 may be index matching oil whose refraction index is adjustable so as to minimize the interfacial reflection between interfaces existing inside the touch panel 100, that is, between the upper and lower substrates 120 and 110 and the fluid 130 and between the driving electrodes 140 and the fluid 130. Also, sealant 150 is applied at the edges of the gap to seal the fluid 132. The sealant 150 may be plastic resin and the like, however is not limited to this.

The driving electrodes 140 are components designed to exert attractive force locally between the upper and lower substrates 120 and 110. In the touch panel 100, by appropriately combining locations where attractive force is exerted, the numbers, sizes, shapes, etc. of button areas created on the user contact surface may be reconfigured. For example, in the case of a touch panel which provides a single fixed type of button area, the location, number, size, shape, etc. of the driving electrodes 140 may also be fixed in consideration of the location, number, size, shapes, etc. of the button area. On the other hand, in the case of a touch panel which provides various types of button areas, driving electrodes may be arranged in a matrix form throughout the entire area of the touch panel 100. In this case, by varying the combinations of the driving electrodes 140 to which a driving voltage is applied, the touch panel 100 may delimit various types of input button areas on the contact surface.

FIGS. 4A and 4B show a perspective view and a side view, respectively, in which the driving electrodes 140 are arranged in a matrix form. Referring to FIGS. 4A and 4B, a line-type lower electrode pattern 142 is formed on the upper surface of the lower substrate 110, and a line-type upper electrode pattern 144 is formed on the lower surface of the upper substrate 120. The lower electrode pattern 142 extends in a first direction, and the upper electrode pattern 144 extends in a second direction which is perpendicular to the first direction. Accordingly, the driving electrodes 140 are arranged in a matrix form at intersections of the lower electrode pattern 142 and the upper electrode pattern 144. Alternatively, it is also possible that lower electrodes and upper electrodes facing each other are formed in a dot form on the lower substrate 110 and the upper substrate 120, respectively.

Figure 5:
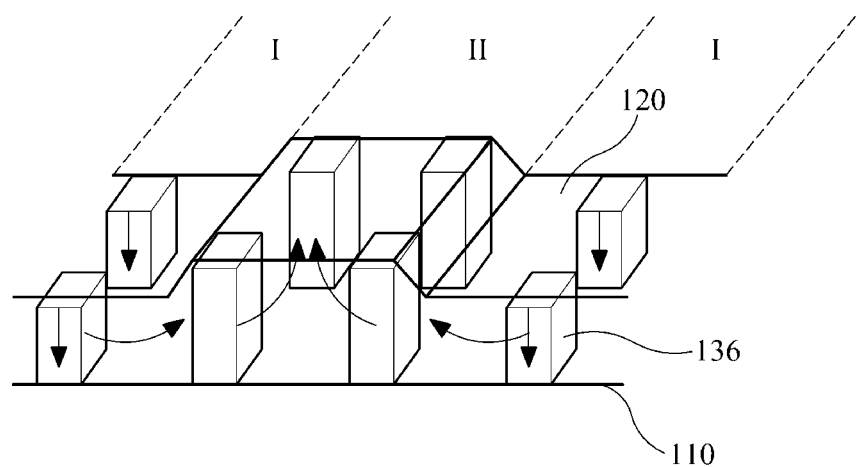
FIG. 5 is a schematic view for explaining a local increase and decrease of a thickness of a gap between the upper and lower substrates of an exemplary touch panel.

FIG. 5 is a view showing an example a configuration of a gap between the upper and lower substrates 120 and 110 of the touch panel 100. FIG. 5 corresponds to a case in which a driving voltage is applied to driving electrodes (not shown) in first areas I and no driving voltage is applied to driving electrodes (not shown) in a second area II.

Referring to FIG. 5, an electric field is created between the upper and lower substrates 120 and 110 due to the driving voltage applied to the first areas I, and an attractive force is exerted locally between the first and second substrates 120 and 110 in the first areas I. Due to the attractive force, the upper substrate 120 is locally pulled down toward the lower substrate 110 and as a result depressed parts are made in the upper substrate 120. That is, in the first areas I, the gap between the upper and lower substrates 120 and 110 is reduced. At this time, the depressed upper substrate 120 presses fluid in the first areas I and thus a part of the fluid flows to the neighboring areas to which no driving voltage has been applied, that is, to the second area II. In the second area II, the upper substrate 120 is pulled up due to an increase in pressure of the fluid. Consequently, a protruded part is made on the upper substrate 120. Since the protruded part is supported by the pressure of the fluid and electrostatic force applied to the neighboring areas (that is, the first areas I), the second area II maintains elasticity when the protruded part is pressed through an input operation.

Figure 6:
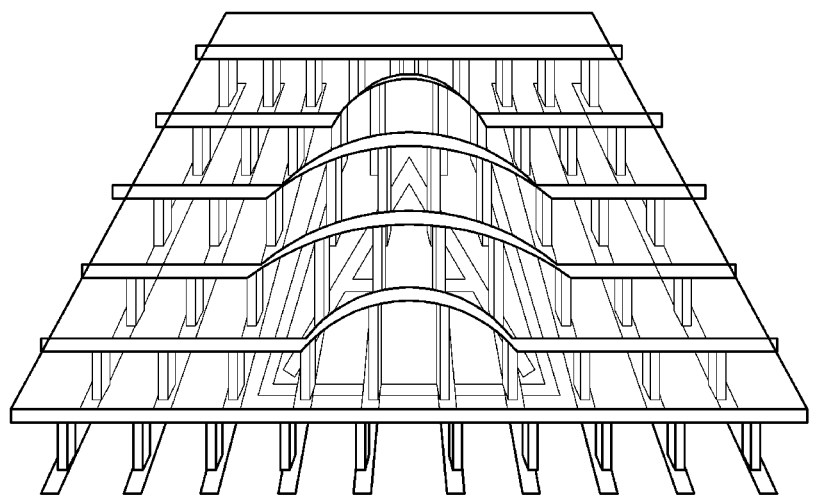
FIG. 6 shows an example where an input button area is delimited on an exemplary touch panel.

FIG. 6 is a perspective view showing an exemplary touch panel with a button input area in which a part of an upper substrate is protruded and the remaining part is depressed. In the touch panel shown in FIG. 6, the upper substrate is locally or selectively protruded at a location corresponding to an input button (for example, an alphabet letter "A" button) displayed on a display. Accordingly, a protruded part of a user contact surface becomes an input button area. As described above, the upper substrate is locally protruded is because a driving voltage is applied to the driving electrodes located in the remaining part except for the part where the input button (the "A" button) is displayed. An upper substrate part where driving electrodes to which the driving voltage is applied are located is pulled down toward the lower substrate, thus pressing fluid such that a part of the fluid flows to the neighboring areas due to the increased pressure. Accordingly, an upper substrate part corresponding to the location where the input button (the "A" button) is displayed is protruded.

In this way, if an input button area is delimited using the structure where some parts of the upper substrate are depressed and the other parts of the upper substrate are protruded, the input button area may be recognized through a tactile sense. In the example shown in FIG. 6, a protruded part may be recognized on the touch panel as an input button using a finger, a stylus, or a pen, etc. Accordingly, a tactile feedback function based on changes in surface shape may be implemented on the touch panel. That is, by varying the surface of a button input area to distinguish the button input area from peripheral areas, changes in texture on the touch panel surface may be felt and detected, thus recognizing the input button area through tactile sense.

FIGS. 7A and 7B and FIGS. 8A and 8B show other examples in which an input button area is delimited on the contact surface of an upper substrate in the touch panel described above with reference to FIGS. 4A and 4B. Likewise, in the examples shown in FIGS. 7A and 7B and FIGS. 8A and 8B, by using variations in surface shape in which some parts of the touch panel are protruded and the other parts are depressed, an input button area is delimited on the contact surface.

Figure 7A:
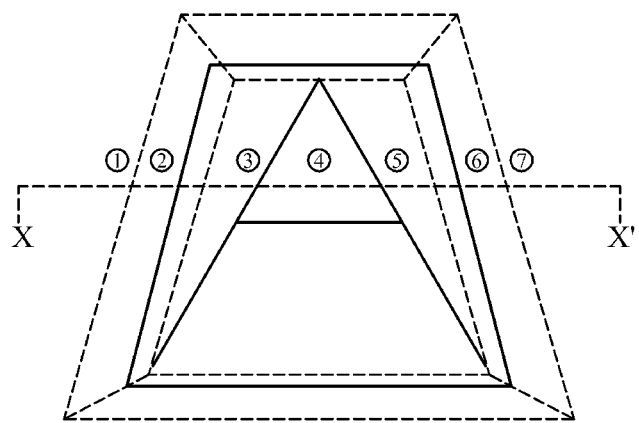
FIGS. 7A and 7B are top and side views, respectively, that show an example in which an input button area is delimited on a contact surfaces of an upper substrate in the exemplary touch panel.
Figure 7B:
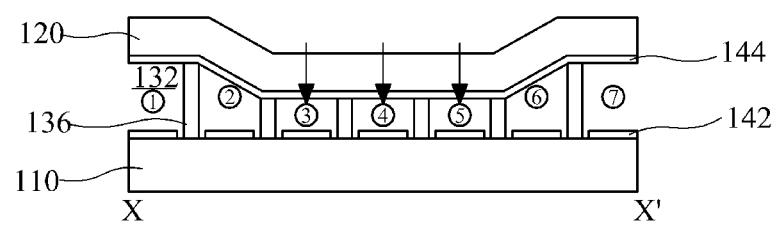

Referring to FIGS. 7A and 7B, the gap between the upper and lower substrates is reduced in parts (③, ④ and ⑤) where a button "A" is displayed on a display, and increases in the peripheral parts (①, ②, ⑥ and ⑦). That is, FIG. 7A corresponds to the case where the parts (③, ④ and ⑤) where the upper substrate is depressed are delimited as an input button area. When utilizing the touch panel having this structure, the parts (③, ④ and ⑤) may be felt as a concave portion of the contact surface. Also, when the gap in the input button area (③, ④ and ⑤) is reduced below a threshold thickness, an input is recognized and accordingly, an occurrence of input errors due to unintended slight contact may be avoided. The threshold thickness may be predetermined.

Figure 8A:
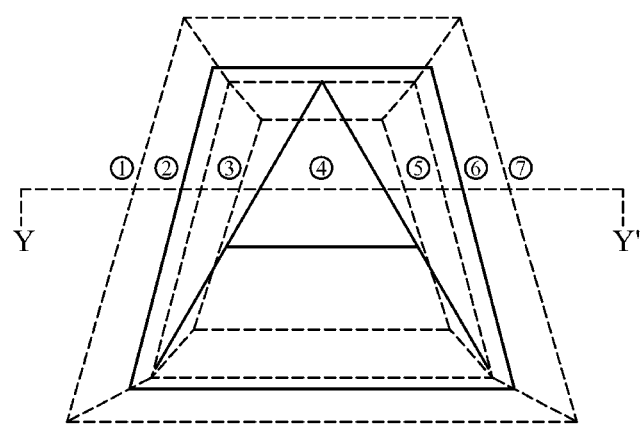
FIGS. 8A and 8B are top and side views, respectively, that show another exemplary in which an input button area is delimited on a contact surface of an upper substrate in the exemplary touch panel.
Figure 8B:
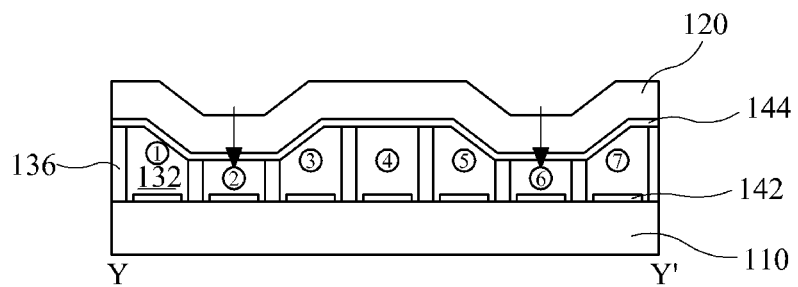
Figure 9A:
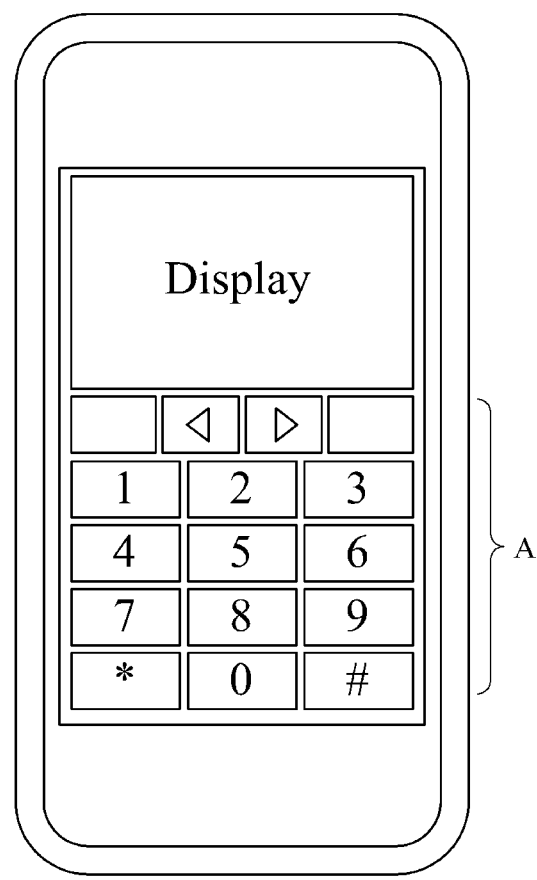
FIGS. 9A to 9D show various examples where input button areas are configured respectively on touch panels, wherein in the examples, the input buttons are provided in the forms of numeric keys, Qwerty keys, icon menus and menu bars, respectively.
Figure 9B:
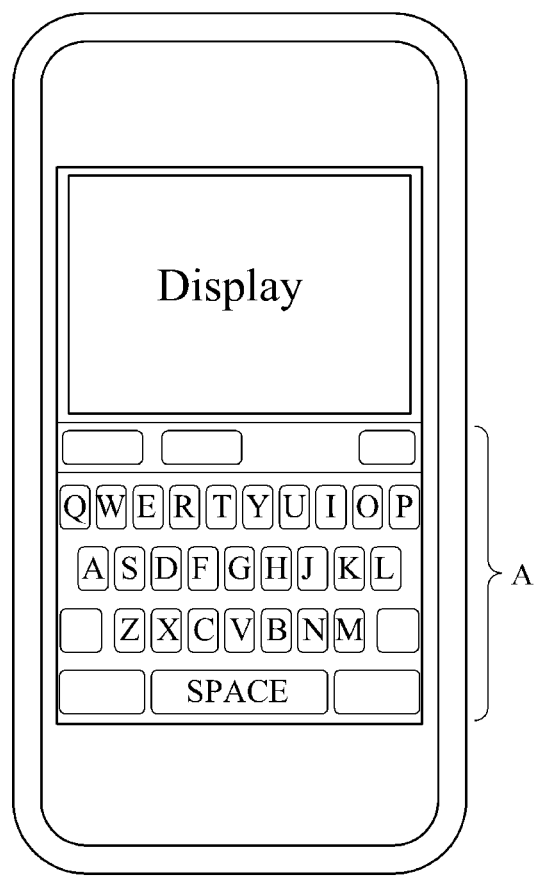
Figure 9C:
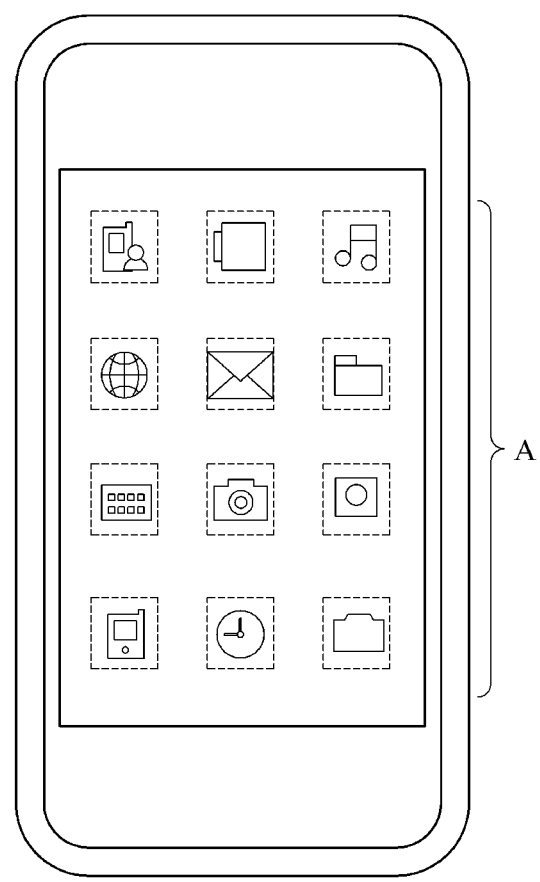
Figure 9D:
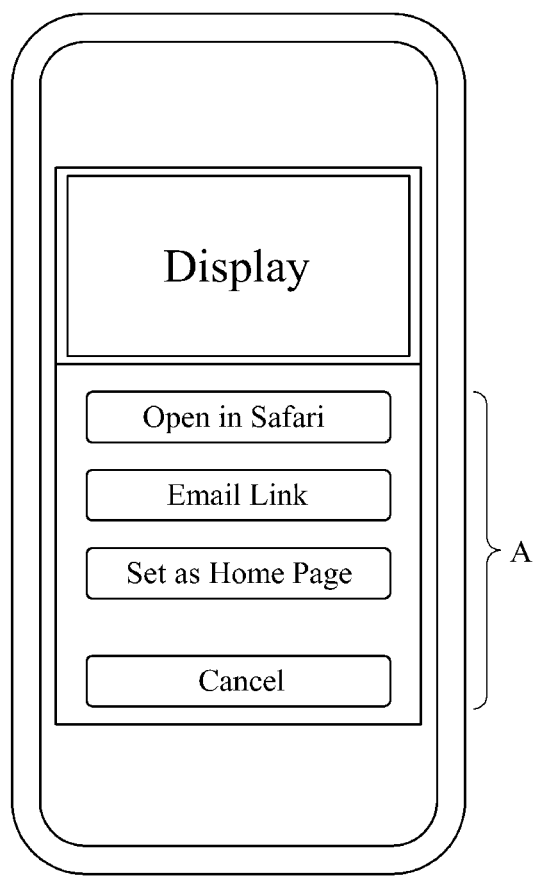

Now referring to FIGS. 8A and 8B, the gap between the upper and lower substrates is reduced only in the edge portions (② and ⑥) of parts where a button "A" is displayed on a display, and the gap increases in the parts (③, ④ and ⑤) where the button "A" is displayed or in the outer portions (① and ⑦). Accordingly, FIGS. 8A and 8B correspond to the case in which the upper substrate parts (③, ④ and ⑤) surrounded by the parts (② and ⑥) depressed due to the thickness reduction of the gap are delimited as an input button area, and the example illustrated in FIGS. 8A and 8B are a modification of the example illustrated in FIGS. 7A and 7B. FIGS. 7A and 7B show an example where the gap between the upper and lower substrates is reduced in all other areas (①, ②, ⑥ and ⑦ in FIGS. 7A and 7B) except for an input button area, whereas FIGS. 8A and 8B show an example where the gap between the upper and lower substrates is reduced only in the edge portions of an input button area.

In the touch panel according to the embodiment illustrated in FIGS. 8A and 8B, the peripheral areas which are not the input button area are small, and the edge portion of the input button area may be sensed through tactile sense. Hence, since a relatively large number of input button areas may be delimited on the contact surface and also buttons adjacent to each other can be identified through a tactile sensation, the touch panel according to the current embodiment can be usefully applied to applications where many buttons have to be displayed on a small-sized display, such as an application where Qwerty keys are displayed on a display of a mobile phone.

Also, in the touch panel illustrated in FIGS. 7A and 7B and FIGS. 8A and 8B, a repulsive force similar to that felt when pressing a mechanical key pad can be provided. In such a case, a gap in the input button area has already been reduced due to electrostatic force (see FIGS. 7A and 7B) or flow of fluid in the input button area is limited due to a decrease of the gap in the edge portions of the input button area (see FIGS. 8A and 8B). Also, in the touch panel according to the embodiment illustrated in FIGS. 8A and 8B, if a driving voltage is cut off when the gap in the input button area is reduced below a threshold thickness, fluid in the input button area may abruptly flow to the peripheral areas, which provides a clicking sensation.

The touch panel according to the above-described embodiment functions as a general touch panel in usual use (for example, when an application not using any input is driven or when the currently preceding stage of an application does not require any input). However, when figures, characters, symbols, etc. are input through the touch panel or when an icon is selected and an input signal generated, the touch panel may function as a user interface. The touch panel according to the above-described embodiment functions as a general touch panel when no driving voltage is applied, and when a driving voltage is applied, fluid inside the touch panel moves due to attractive force generated locally between the upper and lower substrates, so that a input button is formed on the touch panel.

The input button may be formed on the entire area or a partial area of the touch panel, and the numbers, shapes, sizes, etc. of buttons are not limited. FIGS. 9A to 9D show various examples where input button areas are configured on touch panels, wherein in the examples, the input buttons are provided in the forms of numeric keys, Qwerty keys, icon menus and menu bars, respectively. Referring to FIGS. 9A through 9D, if a user tries to select a specific application (for example, when the user tries to call, to input a message, to select a menu or to use the Internet), an entire area (for example, the case shown in FIG. 9C) or a partial area (the cases shown in FIGS. 9A, 9B, and 9D) represented as "A" on the touch panel are used as an input part. The remaining area except for the area "A" may be used as a display to display characters, figures, etc. which are input. Meanwhile, if no driving voltage is applied, the touch panel may be wholly used as a display.

If a specific button is pressed and an input is recognized, the previous buttons are restored according to the type of application, the next stage of the application, or another application is executed so that another type of button is formed on the touch panel, or no button is formed to return the panel to acting as a general touch panel.

A number of embodiments have been described above. Nevertheless, it will be understood that these embodiments are exemplary and various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A touch panel comprising:
   a first substrate;
   a second substrate which is spaced from the first substrate by a distance, the second substrate comprising a contact surface thereon; and
   a fluid disposed in a gap between the first substrate and the second substrate, wherein an input button area of the contact surface is delimited due to movement of the fluid when a driving voltage is applied, and if a thickness of the gap between the first substrate and the second substrate is reduced below a threshold thickness value in the input button area, the driving voltage is cut off.

2. The touch panel of claim 1, wherein the movement of the fluid occurs when the second substrate is deformed so that a thickness of the gap is locally increased and decreased.

3. The touch panel of claim 2, wherein the second substrate is deformed when electrostatic force arises locally between the first substrate and the second substrate.

4. The touch panel of claim 2, wherein the input button area is a first area which is surrounded by a second area in which a thickness of the gap is reduced.

5. The touch panel of claim 1, wherein it is determined whether the thickness of the gap is reduced below the threshold thickness value by measuring a variation in capacitance that occurs in the input button area.

6. The touch panel of claim 1, wherein it is determined that an input has occurred in the input button area when the driving voltage is cut off.

7. The touch panel of claim 1, wherein the thickness of the gap is divided into a plurality of levels to provide a multi-level input.

8. The touch panel of claim 1, wherein the fluid is a transparent index matching oil.

9. A touch panel comprising:
a first substrate;
a second substrate which is spaced from the first substrate, the second substrate comprising a deformable contact surface thereon;
a plurality of driving electrodes comprising at least one first electrode formed on the first substrate, and at least one second electrode formed on the second substrate; and
an elastic layer including fluid disposed in a gap between the first substrate and the second substrate,
wherein an input button area is formed on a part of the contact surface of the second substrate by a driving voltage applied between the first electrode and the second electrode, and
wherein if a thickness of the gap is reduced below a threshold thickness value by a pressure applied to the input button area, the driving voltage is cut off.

10. The touch panel of claim 9, wherein the input button area is formed due to an electrostatic force applied locally across the gap to increase or decrease the gap thickness in the input button area.

11. The touch panel of claim 9, wherein it is determined whether the thickness of the gap is reduced below the threshold thickness by sensing a variation in capacitance between the first electrode and the second electrode in the input button area.

12. The touch panel of claim 9, wherein whether an input has occurred in the input button area is determined as corresponding to a time at which the driving voltage is cut off.

13. The touch panel of claim 9, wherein the input button area is a first area which is surrounded by a second area in which a thickness of the gap is reduced due to the electrostatic force.

14. The touch panel of claim 9, wherein the input button area is varied by changing combinations of driving electrodes, to which the driving voltage is applied, among the plurality of driving electrodes.

15. A touch panel comprising:
a first substrate;
a second substrate which is deformable and spaced a distance from the first substrate, the second substrate comprising a contact surface thereon; and
a fluid disposed in a gap between the first substrate and the second substrate,
wherein the contact surface includes a first area in which a thickness of the gap is reduced by a force locally applied to the fluid when a driving voltage is applied to the first area, and a second area to which a part of the fluid flows and in which a thickness of the gap increases, and
an input button area is delimited on the contact surface using the first area and the second area,
wherein when a pressure exceeding a threshold value is sensed on the input button area while the driving voltage continues to be applied, the driving voltage is cut off.

16. The touch panel of claim 15, wherein the second area is the input button area.

17. The touch panel of claim 16, further comprising a plurality of driving electrodes comprising at least one first electrode formed on the first substrate and at least one second electrode formed on the second substrate,
wherein the force is generated when the driving voltage is applied to an entire area or a partial area of the plurality of driving electrodes.

18. The touch panel of claim 15, wherein the input button area is delimited to correspond to an input button which is displayed on a display.

19. A touch panel comprising:
a hard first substrate;
a second substrate which is deformable and spaced a distance from the first substrate, the second substrate comprising a user contact surface thereon; and
a fluid disposed in a gap between the first substrate and the second substrate;
wherein when electrostatic force is applied locally between the first substrate and the second substrate, the second substrate is protruded in a peripheral area of an area to which the electrostatic force is applied and the protruded area of the second substrate is delimited as an input button area, and
if a pressure exceeding a threshold value is sensed on the input button area, the electrostatic force is removed.

20. The touch panel of claim 19, wherein it is determined that a user input occurs on the input button area when the electrostatic force is removed.

21. An electronic device comprising:
a rigid, transparent lower substrate;
a deformable, transparent upper substrate which is spaced apart from the lower substrate;
a plurality of driving electrodes comprising at least one first electrode formed on the lower substrate and at least one second electrode formed on the upper substrate; and
an elastic layer comprising a plurality of elastic spacers dispersed in a gap between the upper substrate and the lower substrate, and fluid filled in the gap,
wherein when a driving voltage is applied to an entire area or a partial area of the plurality of driving electrodes, the upper substrate locally presses the fluid by electrostatic force which arises across driving electrodes to which the driving voltage is applied, so that the upper substrate is protruded upward in an area where the electrostatic force is not exerted,
wherein the protruded area of the upper substrate delimits an input button area, and wherein when a pressure exceeding a threshold value is sensed on the input button area, the driving voltage is cut off.

22. An electronic device comprising:
a pair of substrates comprising a first substrate, and a second substrate spaced from the first substrate and comprising a deformable user contact surface;
a plurality of driving electrodes comprising a plurality of first electrodes formed on the first substrate and a plurality of second electrodes formed on the second substrate, wherein a driving voltage is applied to an entire area or a partial area of the plurality of driving electrodes; and
an elastic layer comprising fluid filled in a gap between the pair of substrates,
wherein an input button area is delimited by an electrostatic force that arises in an entire area or a partial area of the plurality of driving electrodes to locally increase or decrease the gap in the entire area or the partial area, and
wherein if a thickness of the gap between the first substrate and the second substrate is reduced below a threshold thickness due to a force applied on the input button area by the user, the driving voltage is cut off.

23. The electronic device of 22, wherein the pair of substrates, the plurality of driving electrodes and the fluid are each made of a transparent material.

\* \* \* \* \*